No. 627,815. Patented June 27, 1899.
H. AUSTIN.
LATHE CHUCK.
(Application filed Dec. 10, 1898.)
(No Model.) 2 Sheets—Sheet 1.

Witnesses
Inventor
Herbert Austin
by Henry Connett
Attorney

THE NORRIS PETERS CO., PHOTO-LITHO., WASHINGTON, D. C.

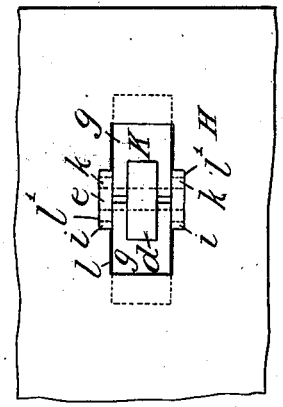
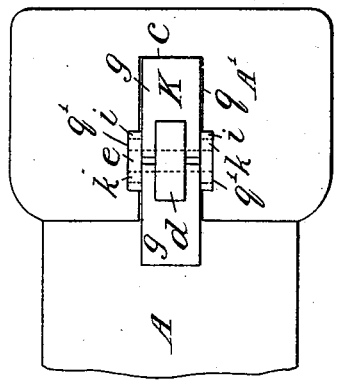
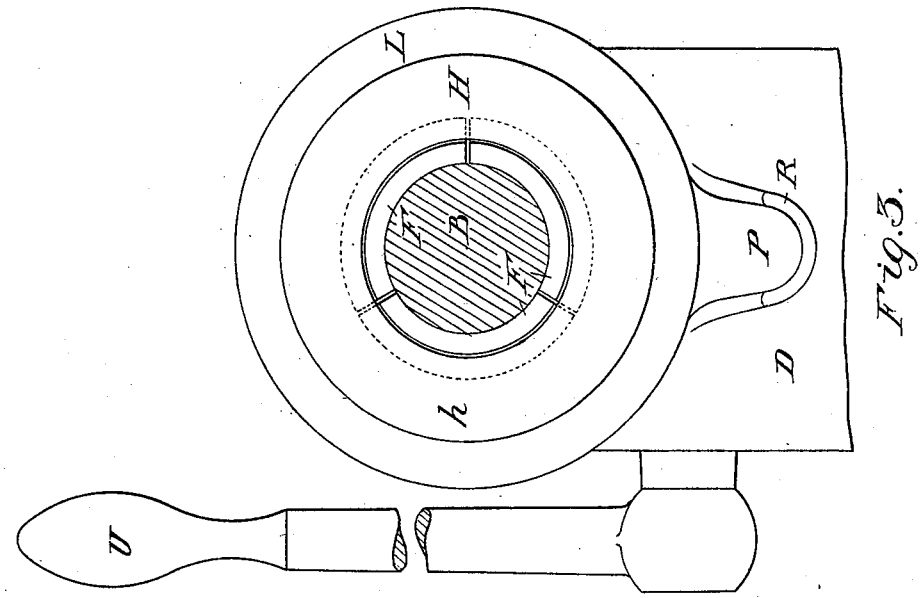

UNITED STATES PATENT OFFICE.

HERBERT AUSTIN, OF BIRMINGHAM, ENGLAND.

LATHE-CHUCK.

SPECIFICATION forming part of Letters Patent No. 627,815, dated June 27, 1899.

Application filed December 10, 1898. Serial No. 698,827. (No model.)

*To all whom it may concern:*

Be it known that I, HERBERT AUSTIN, a subject of the Queen of Great Britain, residing in the city of Birmingham, in the county of Warwick, England, have invented certain new and useful Improvements in Lathe-Chucks, of which the following is a specification.

This invention has for its object more particularly to improve the constuction of chucks for lathes in which a bar of metal to be operated upon is fed forward intermittently through a hollow lathe-spindle, as in the type of lathes known as "capstan-lathes;" but the invention is applicable as well to chucks for other lathes.

I will describe the invention in relation to a lathe in which it is desired to feed a bar intermittently through a hollow spindle, after which its application to other lathes will be perfectly clear without need for further description or illustration.

According to a form of chuck which has already been employed with a lathe in which it is desired to feed a bar intermittently through a hollow spindle a portion of the interior of the hollow lathe-spindle is formed conical and segment-wedges are arranged in circular form around the bar to be operated upon, and when moved inward these wedges are caused, by bearing against the conical surface of the interior of the hollow spindle, to press against and tightly grip the bar, and thus prevent it from moving endwise and at the same time insure that it will revolve with the hollow spindle. A sleeve which surrounds the end of the spindle is formed with an inward flange at its outer end, which takes in front of and engages shoulders on the wedges. The inner end of the sleeve is provided with an abutment, against which pressure is exerted by suitable appliances to move the sleeve inward, and thus tighten up the wedges, and the pressure against the abutment is removed in order to release the grip of the wedges around the bar when it is desired that the bar shall be fed forward. The taper of the conical portion of the opening through the spindle is such that the wedges become loose therein when released from the pressure by which they are tightened. Means, however, which have been employed for moving back the sleeve, and thereby effect the clamping, involve considerable friction in working, and very considerable force must be exerted to tighten up the wedges. The special feature of this invention consists in improved means for use in tightening up the wedges and releasing them.

Figure 2:
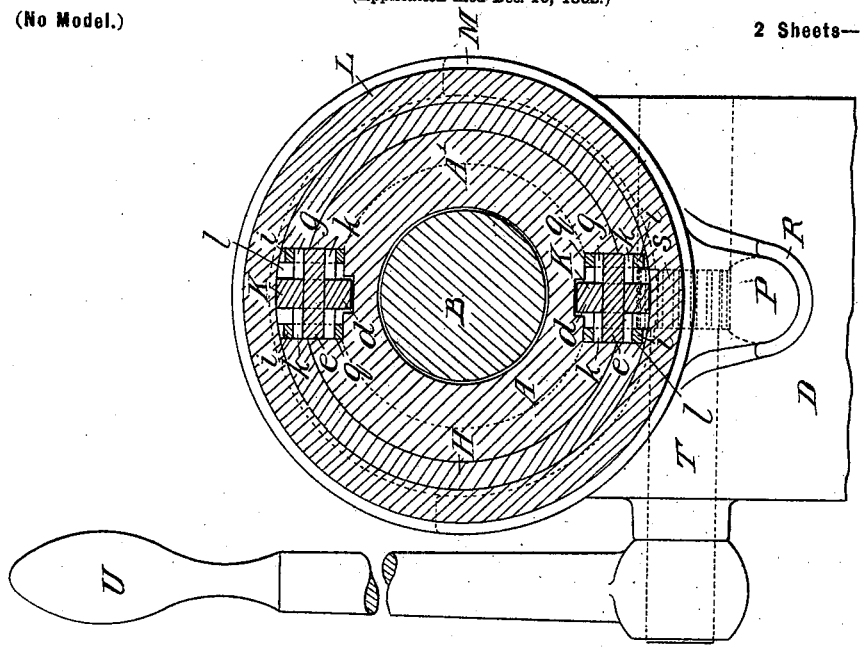
Figure 1:
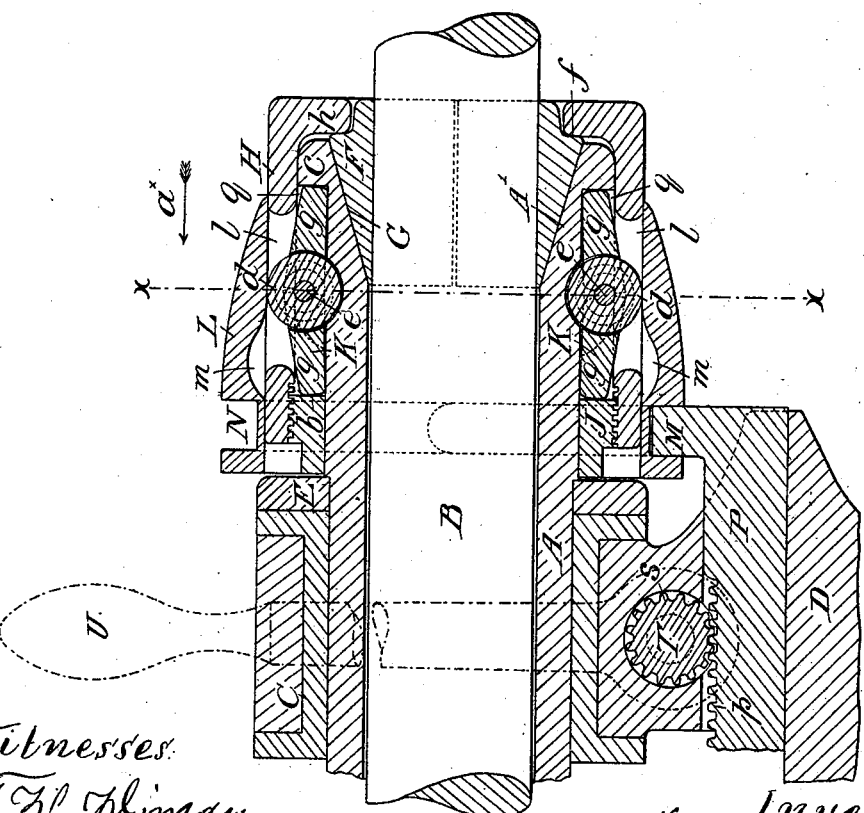

In the drawings which serve to illustrate my invention, Figure 1 is a longitudinal section through the axis of the chuck. Fig. 2 is a transverse section taken on line $x\ x$ in Fig. 1, looking in the direction of the arrow $a^x$. Fig. 3 is a front end view of the chuck. Fig. 4 is a view of the back or outer side of one of the toggles K, hereinafter described, showing also a portion of the sleeve H, hereinafter described; and Fig. 5 is a side elevation of the forward portion of the lathe-spindle, showing a back or outer face view of one of the toggles.

A is the hollow or tubular spindle through which the bar of metal B to be operated upon by the tools must be fed forward intermittently.

C is the forward portion of the bearing within which the spindle rotates, and D a portion of the head-stock of the machine.

E is a collar which is fixed tightly around the spindle and transmits the endwise thrust of the spindle to the front or outer face of the bearing C.

The wedges F are formed, as usual in this type of chuck, as segments of a ring which has a conical or tapered exterior, and are placed, as is usual, within the conical or flared forward end G of the interior of the spindle, and are tightened up therein to wedge themselves between the conical surface G and the surface of the bar B when it is intended that the bar shall revolve with the chuck; but they are released, so as to allow them to become loose between such conical surface and the bar, when it is desired to feed the bar forward through the chuck. The forward end of the hollow spindle projects beyond the bearing C, as shown and as is usual with this type of chuck. The wedges are tightened up, as is usual, by means of a sleeve H, which surrounds the forward end of the spindle and is formed with an inward flange $h$, which takes in front of or otherwise engages shoulders $f$ of the wedges F. The inner end of the sleeve H is provided with an abutment $b$, which forms the forward face of a ring J, which is a sliding fit upon the spindle and is screwed into the hinder or inner end of the sleeve H, so that it may be adjusted endwise in relation thereto. The sleeve is moved back to tighten up the wedges by means of two or more toggles K, which press at one end against the abutment $b$ of the sleeve and at the other end against abutments $c$ of the spindle. Each toggle consists of a central knuckle-roller $d$, a knuckle-spindle $e$, passing loosely through the roller and projecting from each side thereof, and two thrust-pieces $g$, conveniently rounded at their outer ends, which bear against the abutment $b$ and one of the abutments $c$, respectively, and are provided at their inner ends each with a portion which fits against and extends partially around the cylindrical surface of the spindle $e$. Each thrust-piece $g$ has a jaw shape at its inner end, as shown most clearly in Figs. 4 and 5, so as to extend along each side of the roller $d$, and it is preferred to widen out the inner end of each thrust-piece, as shown, to increase its bearing-surface along the corresponding spindle $e$ and to link together the thrust-piece $g$ by means of a pair of hoops or rings $i$, which respectively surround for such purpose the projecting portions $k$ of the thrust-pieces at the opposite sides of the knuckle-joint. The curves at the outer ends of the thrust-pieces $g$ are struck, preferably, from the axis of the spindle $e$, and the faces of the abutments $b$ and $c$ are made flat, whereby a rolling action of the ends of the thrust-pieces against the abutments is insured and slipping is avoided.

The portion A′, Fig. 2, of the spindle A, which extends for some distance backward from the front end of the spindle and in which the abutments $c$ are formed, is larger in diameter than the portion of the spindle which is surrounded by the ring J, and the sleeve H is a sliding fit endwise upon such portion A′. Pockets $q$ are formed in the portion A′ of the spindle to receive the toggles, except for the hinder portions thereof, which project back beyond such enlarged portion A′, and the forward ends of these pockets form the abutments $c$. These pockets are formed with lateral recesses $q'$ to receive the laterally-projecting portions at the knuckles. Openings $l$ are formed through the sleeve H to enable the toggles to be put into position, and these openings have lateral recesses $l'$ for the reception of the laterally-projecting portions of the knuckles.

A part L, which I term for convenience the "gripping-piece" and which corresponds to a part employed for the same or a similar purpose in the chuck referred to as previously employed, embraces the sleeve H. This gripping-piece L is formed with a certain length of its interior cylindrical portion of a diameter to be an easy sliding fit along the sleeve H and with a circumferential concave recess $m$ around its inner face, the contour of which, as seen in the longitudinal section, Fig. 1, eases gradually from the part of greatest diameter into the part which is just a sliding fit along the sleeve. When this gripping-piece is moved to bring the recess $m$ opposite to the rollers $d$, the strain upon the toggles K, and consequently upon the wedges F, is released, owing to the rollers being free to move somewhat into said recess, and the wedges then release themselves within the conical part G of the interior of the spindle, the taper of such conical part being, as is usual, such as to insure that this will be the case, and when the gripping-piece is moved back again the rollers $d$ are gradually forced inward, owing to the curved shape in section of the recess $m$, and the wedges are thus again tightened between the interior conical surface G of the spindle A and the bar B.

The grip of the wedges may be readily adjusted by screwing the abutment J along within the hinder end of the sleeve H—that is to say, in a manner corresponding to that in which such grip has been adjusted in the case of the chuck above referred to as having been previously used.

An important feature of the invention consists in the fact that the abutment $b$ is alined with the abutments $c$, so that the points of the abutments against which the two ends of a toggle respectively bear are in a line which is parallel, or substantially so, with the longitudinal axis of the spindle A, whereby the pressure exerted in a direction to straighten out the toggles produces a maximum force in a direction tending to tighten up the wedges, and thus less force is required in a direction tending to straighten out the toggles than would otherwise be the case.

The gripping-piece L may be moved endwise in any usual or convenient manner. In a construction which I find convenient a claw M, which engages with a groove N, Fig. 1, extending circumferentially about the gripping-piece, is carried by a slide P, which is capable of sliding within a guide-opening R, formed through a portion of the head-stock D, and this slide P is provided with a toothed rack $p$ and is moved endwise by means of a toothed wheel or segment $s$, carried upon an arbor T, which is mounted in the head-stock and is provided with an operating-handle U. The position of this handle is indicated by broken lines only, Fig. 1, as it does not properly appear in such view.

A chuck of the improved character above described may be used also with an ordinary lathe for the purpose simply of tightly gripping and holding the metal or article which is to be operated upon, in which case, of course, it is not necessary that the spindle shall be hollow throughout its entire length. The chuck (apart, of course, from the means by which the gripping-piece is moved endwise) may in such case be so constructed as to be screwed at its hinder end upon or within the spindle or driving-plate of the lathe.

Having thus described my invention, I claim—

1. A lathe-chuck, comprising a hollow, rotative spindle having a flared extremity and exteriorly-situated abutments, wedges in and fitting the tapered or flared mouth of the spindle, a longitudinally-slidable sleeve embracing the spindle and taking over the ends of said wedges, said sleeve having an abutment situated at substantially the same radial distance from the axis of the spindle as the abutments on the latter, toggles between the abutments on the respective parts, the thrust-pieces of each toggle bearing at their respective operative ends on said abutments, and means for distending said toggles by pressure on their knuckles, whereby the bearing-points of said thrust-pieces of the toggles are brought substantially into a plane parallel with the axis of the spindle, substantially as set forth.

2. A lathe-chuck, comprising a rotative part having a concentric flared or tapered opening and abutments, wedges arranged around the axis of such part and having their outer surfaces shaped to fit the interior surface thereof, a longitudinally-movable sleeve in relation to such rotative part and engaged at its outer end with the outer ends of said wedges and provided at its inner end with an abutment, toggles, each having two thrust-pieces which extend from a common knuckle, spindles against which the inner ends of the thrust-pieces bear, rollers carried by such spindles, said thrust-pieces bearing at their respective outer ends against the abutment of the sleeve and the abutments of the said rotative part, and means for pressing against said rollers to expand the toggles, substantially as set forth.

3. A lathe-chuck, comprising a rotative part having a concentric, flared or tapered opening and abutments, wedges arranged around the axis of such part and having their outer surfaces shaped to fit the interior surface thereof, a sleeve mounted to be capable of moving endwise in relation to such rotative part, engaged at its outer end with the outer ends of said wedges, and provided at its inner end with an abutment, toggles, each having two thrust-pieces which extend from a common knuckle, spindles against which the inner ends of the thrust-pieces bear, rollers carried by such spindles, said thrust-pieces bearing at their respective outer ends against the abutment of the sleeve and the abutments of the said rotative part, a gripping-piece formed with an interior cam-face of which a portion is cylindrical and of which a portion is formed as a circumferential recess the contour of which is shaped to gradually join into the cylindrical portion, and means for operating such gripping-piece, substantially as set forth.

4. A lathe-chuck, comprising a spindle, having a portion of its interior flared or tapered, wedges arranged around the axis of said spindle and having their outer surfaces shaped to fit the interior surface thereof, a sleeve embracing and slidable endwise on said spindle, engaged at its outer end with the outer ends of the wedges, and provided at its inner end with an abutment, toggles, each having two thrust-pieces which extend from a common knuckle, spindles against which the inner ends of the thrust-pieces bear, rollers carried by such spindles, said thrust-pieces bearing at their respective outer ends against the abutment of the sleeve and abutments on the said spindle, a gripping-piece embracing the said spindle and having a cam-face, a portion of which is cylindrical and a portion in the form of a circumferential, concave recess, which connects by a gradual easement with the cylindrical portion, a slide mounted within a suitable fixed guide, engaged with said gripping-piece, and provided with teeth, a toothed segment or wheel gearing with such teeth, and a handle by which such segment or wheel may be turned and the gripping-piece thereby operated through the medium of the slide, substantially as set forth.

In witness whereof I have hereunto signed my name, this 14th day of November, 1898, in the presence of two subscribing witnesses.

HERBERT AUSTIN.

Witnesses:
STEPHEN WATKINS,
CHARLES E. BAXTER.